(12) United States Patent
Hegler et al.

(10) Patent No.: US 11,112,035 B2
(45) Date of Patent: Sep. 7, 2021

(54) SYSTEM AND METHOD FOR SECURING FITTINGS TO FLEXIBLE PIPE

(71) Applicant: TRINITY BAY EQUIPMENT HOLDINGS, LLC, Houston, TX (US)

(72) Inventors: Matthew Allen Hegler, Kingwood, TX (US); Jagtar Thety, Cypress, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/941,819

(22) Filed: Jul. 29, 2020

(65) Prior Publication Data

US 2020/0355298 A1 Nov. 12, 2020

Related U.S. Application Data

(63) Continuation of application No. 16/419,180, filed on May 22, 2019, now Pat. No. 10,753,512.

(60) Provisional application No. 62/825,442, filed on Mar. 28, 2019.

(51) Int. Cl.
| | |
|---|---|
| *F16L 3/08* | (2006.01) |
| *F16L 3/10* | (2006.01) |
| *F16L 3/22* | (2006.01) |
| *F16L 3/16* | (2006.01) |

(52) U.S. Cl.
CPC ............... *F16L 3/1058* (2013.01); *F16L 3/16* (2013.01); *F16L 3/22* (2013.01)

(58) Field of Classification Search
CPC ... F16L 3/1058; F16L 3/16; F16L 3/22; F16L 3/003; B29C 53/582
See application file for complete search history.

(56) References Cited

U.S. PATENT DOCUMENTS

| | | | |
|---|---|---|---|
| 6,926,038 B1 * | 8/2005 | Cook | B29C 66/71 138/127 |
| 7,338,090 B2 | 3/2008 | Baldwin et al. | |
| 7,644,736 B2 * | 1/2010 | Bittenbender | F16L 11/081 138/125 |

(Continued)

FOREIGN PATENT DOCUMENTS

| | | |
|---|---|---|
| AU | 2014299014 | 1/2019 |
| AU | 2014363465 | 1/2019 |

(Continued)

OTHER PUBLICATIONS

U.S. Patent and Trademark Office; PCT International Search Report, issued in connection to application No. PCT/US2020/025537; dated Jun. 11, 2020; 2 pages; U.S.

(Continued)

*Primary Examiner* — Amy J. Sterling
(74) *Attorney, Agent, or Firm* — Greenberg Traurig, LLP; Dwayne L. Mason; Mark G. Chretien

(57) ABSTRACT

A system includes a flexible pipe that includes a liner surrounding a bore of the flexible pipe, a reinforcement layer surrounding the liner, and a shield layer surrounding the reinforcement layer. The system also includes a pipe fitting coupled to an end of the flexible pipe and a securing mechanism at least partially disposed in an opening in at least one of the liner layer, the shield layer, or both of the flexible pipe. The securing mechanism is configured to engage with the reinforcement layer of the flexible pipe when the pipe fitting is coupled to the end of the flexible pipe.

13 Claims, 11 Drawing Sheets

(56) References Cited

U.S. PATENT DOCUMENTS

| | | | |
|---|---|---|---|
| 9,217,527 B2 | 12/2015 | Menor | |
| 10,190,722 B2 | 1/2019 | Espinasse et al. | |
| 10,197,198 B2 | 2/2019 | Glejbol | |
| 10,226,823 B2 | 3/2019 | Karpachevskyy | |
| 10,226,892 B2 | 3/2019 | Kremers | |
| 10,234,068 B2 | 3/2019 | Varagnolo et al. | |
| 10,281,065 B2 | 5/2019 | Secher et al. | |
| 10,285,223 B2 | 5/2019 | Hatton et al. | |
| 10,288,207 B2 | 5/2019 | Littlestar et al. | |
| 10,378,682 B2 | 8/2019 | Cloos et al. | |
| 10,408,795 B2 | 9/2019 | Nicolas et al. | |
| 10,415,731 B2 | 9/2019 | Boche et al. | |
| 10,429,267 B2 | 10/2019 | Grimsley | |
| 10,436,667 B2 | 10/2019 | Littlestar et al. | |
| 10,442,925 B2 | 10/2019 | Rong et al. | |
| 10,451,206 B2 | 10/2019 | Espinasse et al. | |
| 10,471,661 B2 | 11/2019 | Boczkowski et al. | |
| 10,480,054 B2 | 11/2019 | Valdez et al. | |
| 10,487,965 B2 | 11/2019 | Bouey et al. | |
| 10,494,519 B2 | 12/2019 | Wilson et al. | |
| 10,513,896 B2 | 12/2019 | Gudme et al. | |
| 10,527,198 B2 | 1/2020 | Nicolson et al. | |
| 10,544,889 B2 | 1/2020 | Bouey et al. | |
| 10,544,892 B2 | 1/2020 | Holst | |
| 10,753,512 B1 | 8/2020 | Hegler | |
| 2011/0109079 A1 | 5/2011 | Hegler | |
| 2012/0090720 A1* | 4/2012 | Burrowes | B32B 5/26 138/124 |
| 2014/0352832 A1 | 12/2014 | Schaller | |
| 2017/0248259 A1 | 8/2017 | Heaton et al. | |
| 2017/0314712 A1 | 11/2017 | Nguyen et al. | |
| 2019/0003921 A1 | 1/2019 | Nicholas | |
| 2019/0024830 A1 | 1/2019 | Glejbol | |
| 2019/0094101 A1 | 3/2019 | Spiegel et al. | |
| 2019/0101233 A1 | 4/2019 | Hatton et al. | |
| 2019/0126567 A1 | 5/2019 | Bornemann et al. | |
| 2019/0154186 A1 | 5/2019 | Shawcor | |
| 2019/0162334 A1 | 5/2019 | Westhoff et al. | |
| 2019/0162335 A1 | 5/2019 | Yu et al. | |
| 2019/0162336 A1 | 5/2019 | Andersen et al. | |
| 2019/0186656 A1 | 6/2019 | Kozak et al. | |
| 2019/0194440 A1 | 6/2019 | Rong et al. | |
| 2019/0217337 A1 | 7/2019 | Gujare et al. | |
| 2019/0219473 A1 | 7/2019 | Littlestar et al. | |
| 2019/0242501 A1 | 8/2019 | Bereczkne et al. | |
| 2019/0257448 A1 | 8/2019 | Chalmers et al. | |
| 2019/0285199 A1 | 9/2019 | Nicolson et al. | |
| 2019/0309582 A1 | 10/2019 | Procida | |
| 2019/0338868 A1 | 11/2019 | Hjorth | |
| 2019/0368967 A1 | 12/2019 | Grimsley | |
| 2019/0391097 A1 | 12/2019 | Nicolas et al. | |
| 2020/0011467 A1 | 1/2020 | Holst | |

FOREIGN PATENT DOCUMENTS

| | | |
|---|---|---|
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | PI0808956 | 11/2019 |
| BR | 112013028806 | 12/2019 |
| BR | 112013000428 | 1/2020 |
| BR | PI0924891 | 1/2020 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CN | 109153196 | 1/2019 |
| CN | 109153229 | 1/2019 |
| CN | 109958827 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3314155 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |
| EP | 3014157 | 8/2019 |

(56) References Cited

FOREIGN PATENT DOCUMENTS

| | | |
|---|---|---|
| EP | 3059481 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| FR | 3068104 | 7/2019 |
| FR | 3077997 | 8/2019 |
| FR | 3074251 | 12/2019 |
| FR | 3076337 | 1/2020 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | 045956 T2 | 1/2020 |
| IN | 330637 | 1/2020 |
| PL | 2678216 T3 | 2/2019 |
| PL | 2379299 T3 | 5/2019 |
| RU | 2018113428 | 10/2019 |
| WO | 2018/234790 | 12/2018 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |
| WO | 2020/198708 | 10/2020 |

OTHER PUBLICATIONS

U.S. Patent and Trademark Office; Written Opinion of the International Searching Authority, issued in connection to application No. PCT/US2020/025537; dated Jun. 11, 2020; 6 pages; U.S. Pakistan Patent Office; Examination Report, issued in connection to application No. 270-2020; dated Mar. 2021; 1 page; Pakistan.

\* cited by examiner

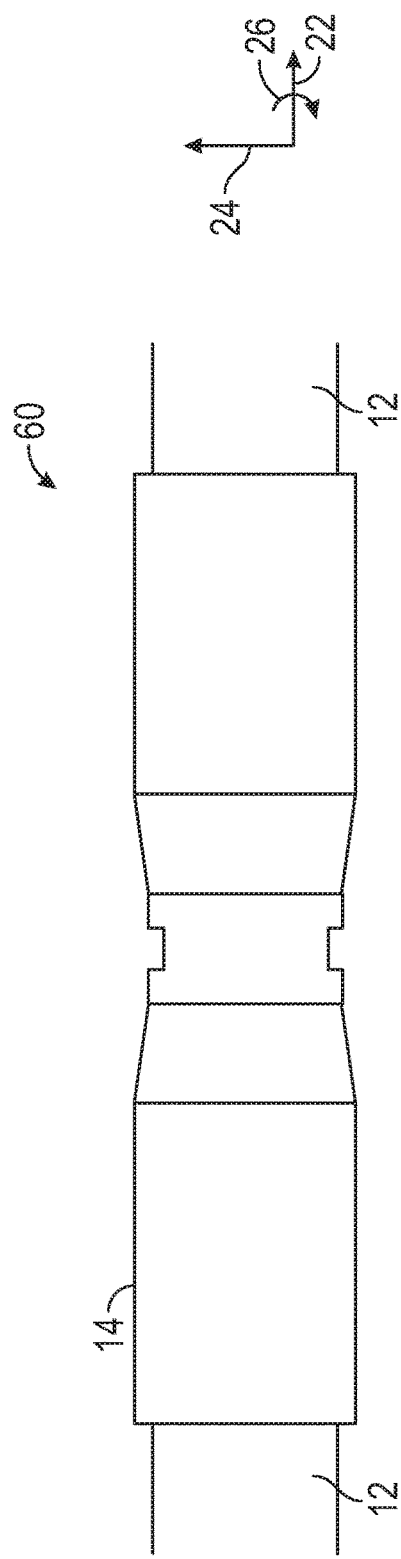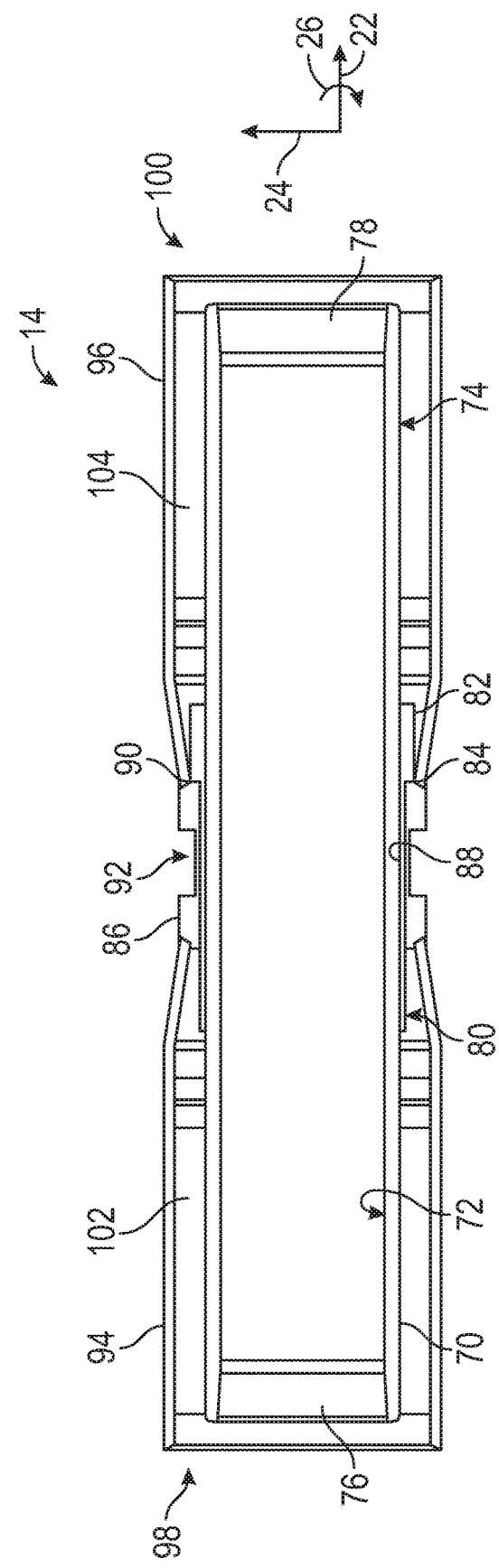

SYSTEM AND METHOD FOR SECURING FITTINGS TO FLEXIBLE PIPE

CROSS-REFERENCE

The present disclosure is a continuation of U.S. patent application Ser. No. 16/419,180, entitled "SYSTEM AND METHOD FOR SECURING FITTINGS TO FLEXIBLE PIPE" and filed on May 22, 2019, which is incorporated herein by reference in its entirety for all purposes.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system that includes a flexible pipe that includes a liner surrounding a bore of the flexible pipe, a reinforcement layer surrounding the liner, and a shield layer surrounding the reinforcement layer. The system also includes a pipe fitting coupled to an end of the flexible pipe and a securing mechanism at least partially disposed in an opening in at least one of the liner layer, the shield layer, or both of the flexible pipe. The securing mechanism is configured to engage with the reinforcement layer of the flexible pipe when the pipe fitting is coupled to the end of the flexible pipe.

In another aspect, embodiments of the present disclosure relate to a method that includes providing a flexible pipe that includes a liner layer surrounding a bore of the flexible pipe, a reinforcement layer surrounding the liner layer, and a shield layer surrounding the reinforcement layer. The method also includes creating an opening in at least one of the liner layer, the shield layer, or both of the flexible pipe, inserting at least a portion of the securing mechanism into the opening, positioning a pipe fitting over an end of the flexible pipe, and coupling the pipe fitting to the end of the flexible pipe thereby engaging the securing mechanism with the reinforcement layer of the flexible pipe.

Other aspects and advantages of the claimed subject matter will be apparent from the following description and the appended claims.

BRIEF DESCRIPTION OF THE DRAWINGS

FIG. 3 is a side view of a pipe fitting according to embodiments of the present disclosure.

FIG. 4 is a cross-sectional view of a pipe fitting according to embodiments of the present disclosure.

DETAILED DESCRIPTION

Figure 1:
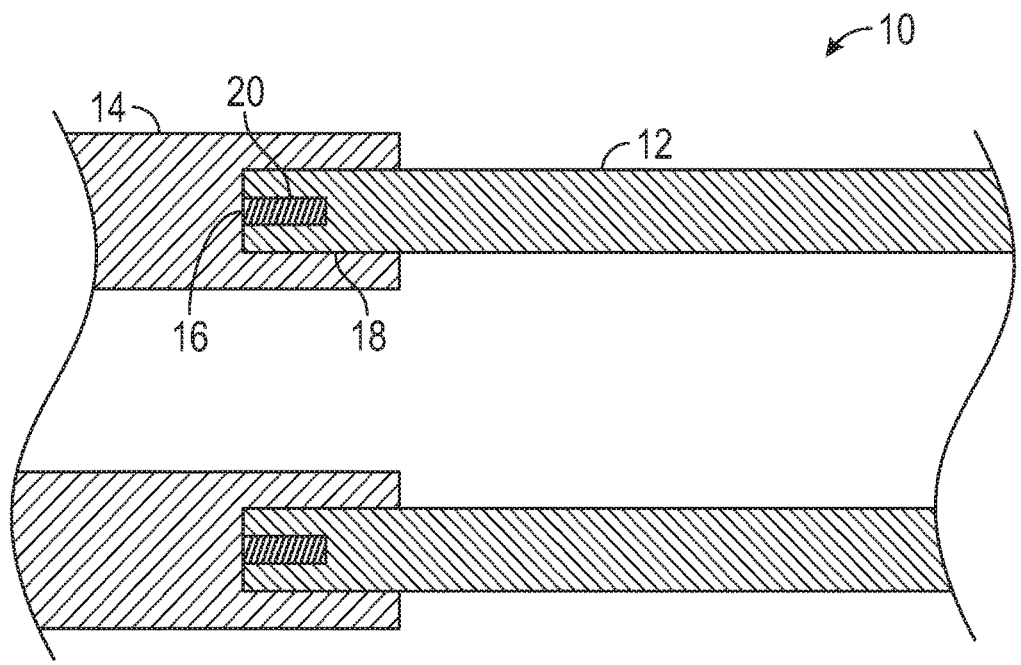
FIG. 1 is a block diagram of a flexible pipe coupling system that includes a flexible pipe, a pipe fitting, and a securing mechanism according to embodiments of the present disclosure.

Embodiments of the present disclosure relate generally to systems used for joining together portions of flexible pipe or joining connectors to flexible pipe. Joining techniques according to embodiments of the present disclosure may include a securing mechanism at least partially disposed in an opening in at least one of an inner layer, outer layer, or both of the flexible pipe. The securing mechanism may be configured to engage with an inner reinforcement layer of the flexible pipe when a pipe fitting is coupled to the flexible pipe.

Embodiments of the present disclosure will be described below with reference to the figures. In one aspect, embodiments disclosed herein relate to embodiments for joining together portions of flexible pipe or joining connectors to flexible pipe.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 illustrates a block diagram of an embodiment of a flexible pipe coupling system 10 that includes a flexible pipe 12, a pipe fitting 14, and a securing mechanism 16. The flexible pipe 12 may refer to any type of flexible pipe or piping capable of being bent into a coil. Such coils of flexible pipe 12 may reduce the amount of space taken up by pipe during manufacturing, shipping, transportation, and deployment compared to rigid pipe that is not capable of being bent into a coil.

Pipe, as understood by those of ordinary skill, may be a tube to convey or transfer any water, gas, oil, or any type of fluid known to those skilled in the art. The flexible pipe 12 may be made of any type of materials including without limitation plastics, metals, a combination thereof, composites (e.g., fiber reinforced composites), or other materials known in the art. Flexible pipe 12 is used frequently in many applications, including without limitation, both onshore and offshore oil and gas applications. Flexible pipe 12 may include Bonded or Unbonded Flexible Pipe, Flexible Composite Pipe (FCP), Thermoplastic Composite Pipe (TCP) or Reinforced Thermoplastic Pipe (RTP). A FCP or RTP pipe may itself be generally composed of several layers as described in more detail below. Flexible pipe 12 may be designed to handle a variety of pressures, temperatures, and conveyed fluids. Further, flexible pipe 12 may offer unique features and benefits versus steel/carbon steel pipe lines in the area of corrosion resistance, flexibility, installation speed and re-usability. Another type of spoolable pipe is coiled tubing. Coiled tubing may be made of steel.

As shown in FIG. 1, the pipe fitting 14 is coupled to an end 18 of the flexible pipe 12. Examples of pipe fittings 14 that may be used with the flexible pipe are described below. In the illustrated embodiment, the securing mechanism 16 is at least partially disposed in an opening 20 in the flexible pipe 12. As described in detail below, the securing mechanism 16 is configured to engage with a layer of the flexible pipe 12 when the pipe fitting 14 is coupled to the end 18 of the flexible pipe 12.

Figure 2:
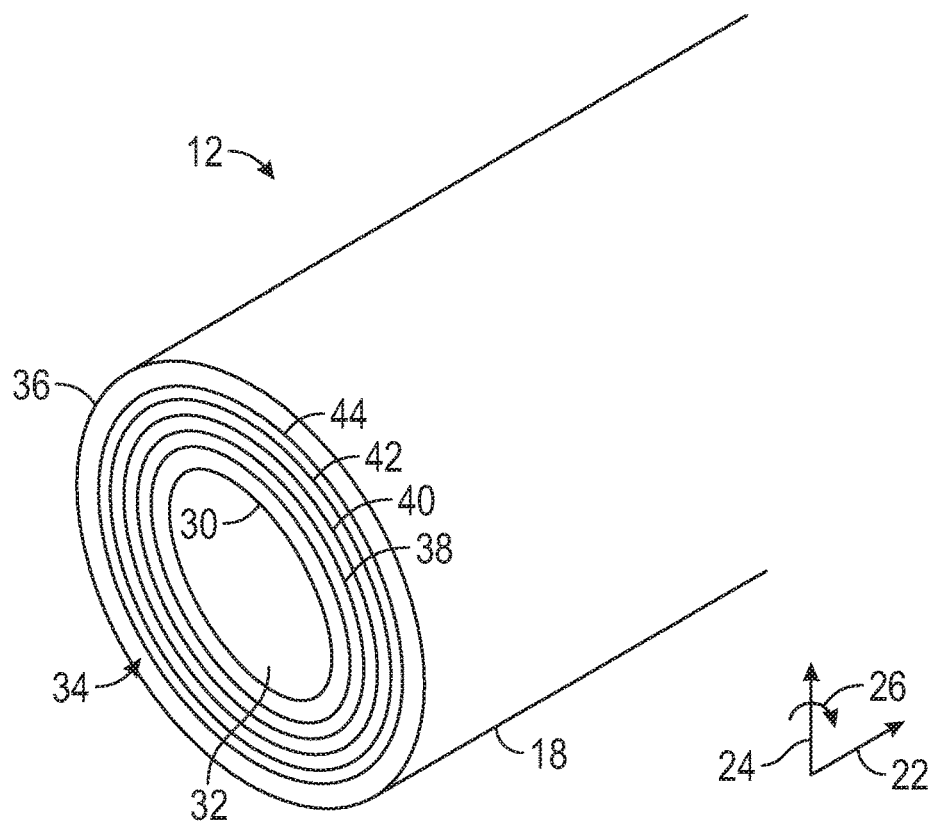
FIG. 2 is a perspective view of a flexible pipe according to embodiments of the present disclosure.

FIG. 2 illustrates a perspective view of an embodiment of the flexible pipe 12. The flexible pipe 12 may be defined by an axial axis or direction 22, a radial axis or direction 24, and a circumferential axis or direction 26. In one or more embodiments, the flexible pipe 12 may include a liner 30 surrounding a bore 32 of the flexible pipe 12, a reinforcement layer 34 surrounding the liner 30, and a shield layer 36 surrounding the reinforcement layer 34. As shown in FIG. 2, the reinforcement layer 34 may include a plurality of layers, such as a first reinforcement layer 38, a second reinforcement layer 40, a third reinforcement layer 42, and a fourth reinforcement layer 44. In certain embodiments, the liner 30 and the shield layer 36 may be made from a high-density polyethylene ("HDPE") and the reinforcement layer 34 may include a plurality of layers of helically wound steel strips. Thus, the flexible pipe 12 may include different layers that may be made of a variety of materials and also may be treated for corrosion resistance, such as the shield layer 36. Coiled tubing may also have a corrosion protection shield layer 36.

FIG. 3 illustrates a side view of an embodiment of the pipe fitting 14. As shown in FIG. 3, the pipe fitting 14 is used to form a pipeline 60 by joining portions of flexible pipe 12 together in an end-to-end configuration via the pipe fitting 14. Thus, the pipe fitting 14 may be referred to as a midline fitting or midline connector. It will be understood that the pipeline 60 may be formed by two or more portions of flexible pipe 12 each joined to one or two adjacent portions of flexible pipe 12 by pipe fittings 14.

FIG. 4 illustrates a cross-sectional view of an embodiment of the pipe fitting 14 shown in FIG. 3. Embodiments of the securing mechanism 16 may be used when the pipe fitting 14 is coupled to the flexible pipe 12, as described in more detail below. In the illustrated embodiment, the pipe fitting 14 includes an inner cylindrical tube 70 having a substantially cylindrical inner surface 72 and an outer surface 74 which is inwardly tapered at a first open end 76 and a further open end 78. The taper helps locate the pipe ends with respect to the pipe fitting 14 during connection. A central region of the outer surface of the tube 70 is stepped outwardly to form a raised central section 80. The raised portion 80 is itself stepped radially outwardly at one end 82 to form an abutment surface 84.

Prior to securing to the flexible pipe 12, a ring 86 is slipped over the first end 76 of the tube 70. The ring 86 has an inner diameter provided by an inner cylindrical surface 88 having a dimension just big enough to slip over the outer diameter of the narrow end of the outer surface of the raised portion 80 of the tube 70. An end 90 of the ring 86 abuts with the surface 84 of the wide end of the raised portion 80. This duly locates the ring 86 in position. The ring 86 has a central cut out region 92 to aid handling. Other profiles of ring 86 may be utilized.

Subsequent to the fitting of the ring 86 about the raised central section 80 of the cylindrical tube 70, a first jacket 94 and further jacket 96 are secured to the connecting ring 86 via a weldment, adhesive, bolt or screw or other such fastening mechanism. Each jacket 94, 96 has a respective open mouth 98, 100 and is generally cylindrical in shape with an inwardly tapered end which tapers radially inwardly at one end of the jacket. Subsequent to the jackets 94, 96 being secured to the ring 86, an annulus region is defined at each end of the pipe fitting 14. The annular region 102 at a first end of the pipe fitting 14 is defined between an outer surface of the cylindrical tube 70 and an inner surface of the jacket 94. A further annulus region 104 is defined between an outer surface of a further end of the tube 70 and an inner surface of the jacket 96. It will be understood that the jackets 94, 96 may be secured to other locations of the pipe fitting 14.

Figure 5:
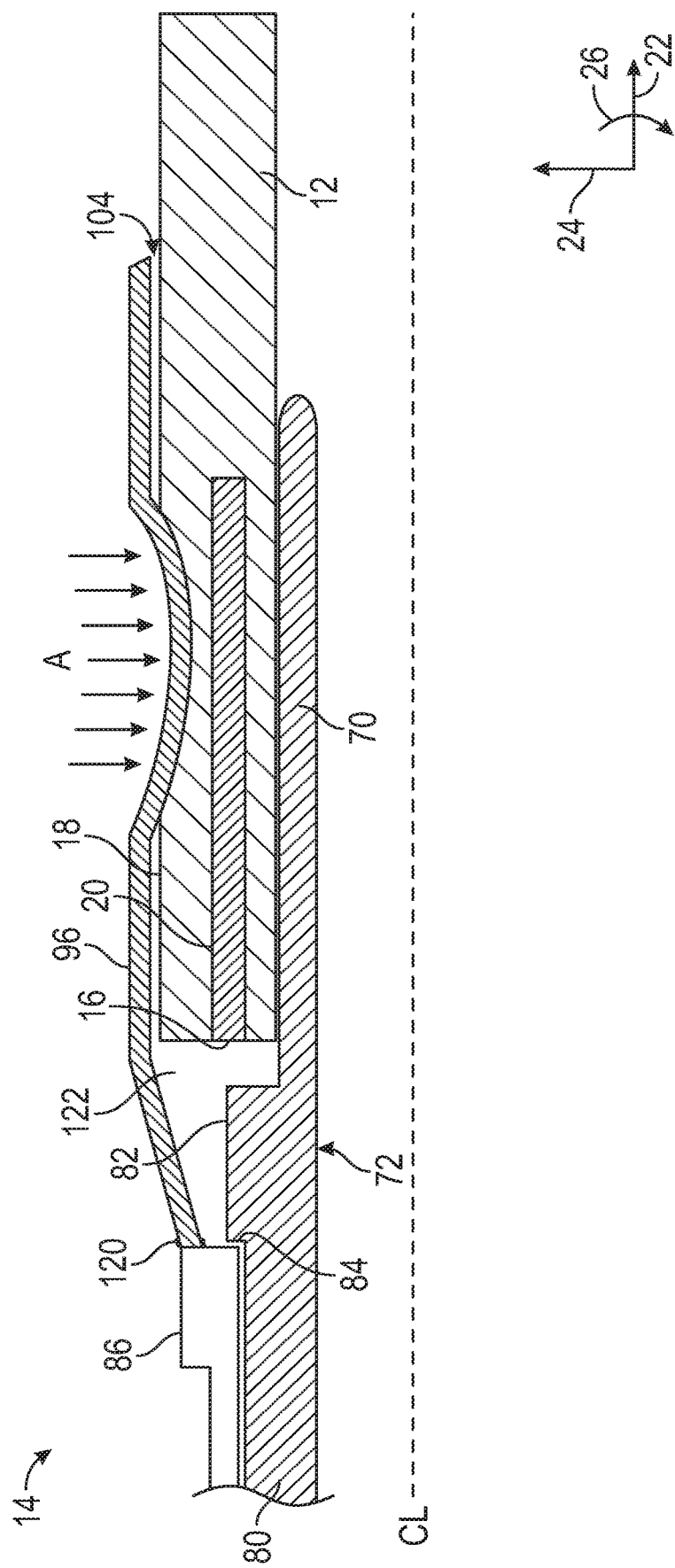
FIG. 5 is a cross-sectional view of a pipe fitting according to embodiments of the present disclosure.

FIG. 5 illustrates a cross-sectional view of an embodiment of the pipe fitting 14 shown in FIGS. 3 and 4 being used to secure the end 18 of the flexible pipe 12 at one end of the pipe fitting 14 between the jacket 96 secured to the ring 86 mounted on the pipe fitting 14. Subsequent to securing the jacket 96 to the connector ring 86 via a weldment 120 or other such fastening, the end 18 of the flexible pipe 12 is introduced into the annulus region 104. Subsequently during a swaging process, the jacket 96 is deformed by a force exerted as shown by arrows A in FIG. 5, which locks the pipe end 18 in the pipe fitting 14. As shown in FIG. 5, the securing mechanism 16 is located in the portion of the flexible pipe 12 deformed by the force. As described below, the securing mechanism 16 engages with the reinforcement layer 34 during the swaging process. It will be appreciated that other fastening techniques, such as bolting, gluing, welding or the like, may be utilized to secure the end 18 of the flexible pipe 12 to the jacket 96 and tube 70.

As illustrated in FIG. 5, the end 18 of the flexible pipe 12 is thus in fluid communication with a space 122 which is a part of the annular region 104 between the jacket 96 and cylindrical body 70. As such, the annular region formed between the liner 30 and the shield layer 36 (e.g., the reinforcement layer 34) will vent directly into this space 122. From there fluid flow occurs via passageways formed as bores or slits through the cylindrical body 70 and/or ring 86 to a corresponding space at the other end of the pipe fitting 14. From there fluid venting from one flexible pipe 12 can pass into the corresponding annular region of the adjacent flexible pipe 12. Although one embodiment of a midline fitting is shown in FIGS. 3-5, it is understood that other embodiments of midline fittings with different features and configurations may be used with embodiments of the securing mechanism 16 described herein.

Figure 6:
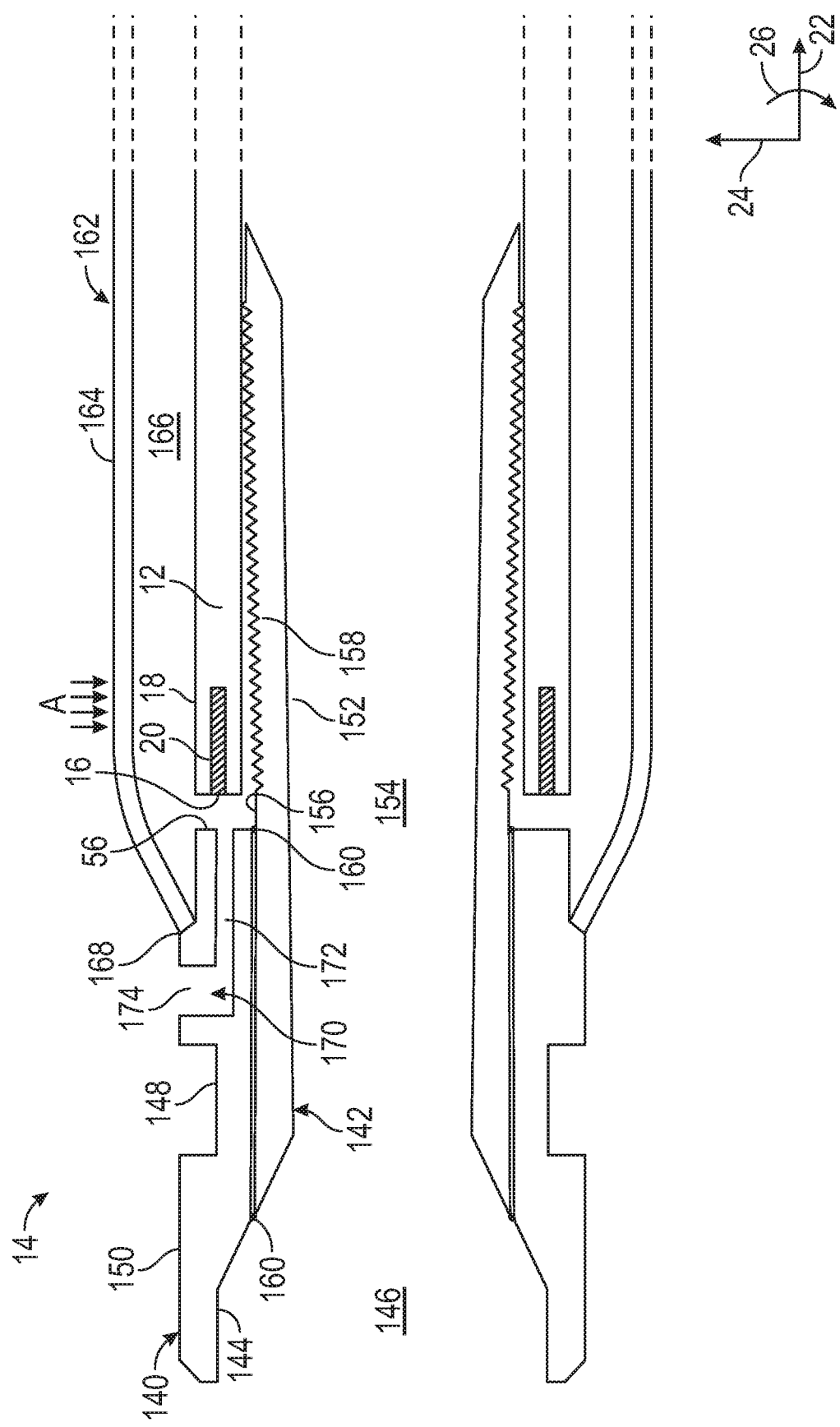
FIG. 6 is a cross-sectional view of a pipe fitting according to embodiments of the present disclosure.

FIG. 6 illustrates a cross-sectional view of an embodiment of the pipe fitting 14. As shown in FIG. 6, the pipe fitting 14 is used to connect the flexible pipe 12 to its destination (e.g. a well head valve, another pipe fitting, or a connector of another pipe). Thus, the pipe fitting 14 may be referred to as an end fitting. In the illustrated embodiment, the pipe fitting 14 includes two separate components that are affixed to each other: an outer body 140 and an inner body 142.

The outer body 140 is generally cylindrically shaped having an inner surface 144 that defines a bore 146 extending longitudinally through the outer body 140. A connector notch 148 is formed on the outer surface 150 of outer body 140 to facilitate connection to its destination. The inner body 142 is generally cylindrically shaped with an inner surface 152 that defines a bore 154 extending longitudinally through the inner body 142. One end of the inner body 142 has serrations on the outer surface 156 of the inner body 142, forming a serrated pipe connector 158 for receiving and securing the pipe end 18. The other end of the inner body 142 is disposed in bore 146 and mounted to the outer body 140. Specifically, the outer surface 156 of inner body 142 is secured to the inner surface 144 of the outer body 140, preferably with a press-fit (i.e. shear force between the inner surface 144 of outer body 140 and the outer surface 156 of inner body 142, creating an interference fit therebetween). The interference fit can optionally be temperature enhanced, where one of the inner/outer bodies 142, 140 is heated and the other is cooled before being fitted together so additional compressive forces are generated after being fitted together as they equalize in temperature. Optional welds 160 can be formed at the edges of the inner/outer bodies 142, 140, which constitute a redundant seal to contain pressurized liquids/gasses. Serrations or threads could additionally or alternatively be used to secure the outer and inner bodies 142, 140 together for enhanced tensile capacity.

A pipe assembly 162 connects to the pipe fitting 14. Pipe assembly 162 includes the flexible pipe 12 and a jacket 164 surrounding the flexible pipe 12. The end 18 of the flexible pipe 12 slides over and engages the serrated pipe connector 158. The end of the jacket 164 is secured to the outer body 140 by a weld 168. Any liquids or gasses that leak out of the flexible pipe 12 and into a space 166 between flexible pipe 12 and jacket 164 are captured by jacket 164 and guided to the pipe fitting 14.

A vent passage 170 is formed through the outer body 140, providing venting for space 166. Preferably, passage 170 includes a first passage portion 172 extending longitudinally within the outer body 140 (parallel to bore 146), and a second passage portion 174 extending outwardly from the first passage portion 172 to the outer surface 150 of outer body 140 (i.e. first and second passage portions 172, 174 are orthogonal to each other). Passage 170 provides fluid communication between space 166 and the outer surface 150 of outer body 140, where leaked liquids or gasses in space 166 can be vented and captured.

During a swaging process, the jacket 170 is deformed in a similar manner as the pipe fitting 12 shown in FIG. 5, which locks the pipe end 18 in the pipe fitting 14. As shown in FIG. 6, the securing mechanism 16 is located in the portion of the flexible pipe 12 deformed by the force exerted as shown by arrows A. The securing mechanism 16 engages with the reinforcement layer 34 during the swaging process. Although one embodiment of an end fitting is shown in FIG. 6, it is understood that other embodiments of end fittings with different features and configurations may be used with embodiments of the securing mechanism 16 described herein.

Figure 7:
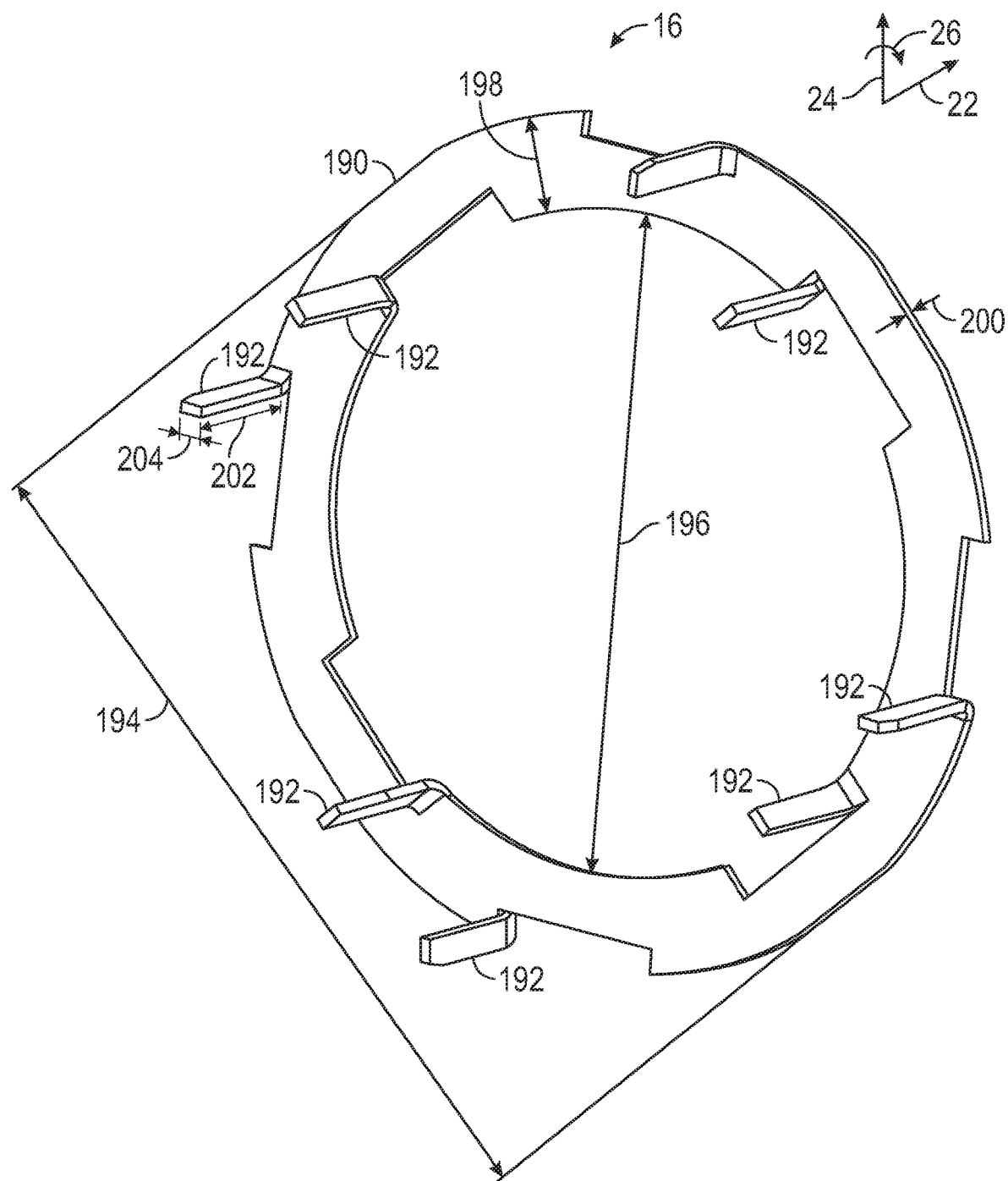
FIG. 7 is a perspective view of a securing mechanism according to embodiments of the present disclosure.

FIG. 7 illustrates a perspective view of an embodiment of the securing mechanism 16. In the illustrated embodiment, the securing mechanism 16 includes a support ring 190 with a plurality of tabs 192 integrally formed from the ring 190. The support ring 190 may defined by an outside diameter 194, an inside diameter 196, a width 198, and a thickness 200. The tabs may be defined by a length 202 and a height 204. As shown in FIG. 7, L-shaped cuts may be made in the support ring 190 and the resulting tab 192 bent to be approximately parallel with the axial axis 22. In other embodiments, the tabs 192 may be formed separate from the support ring 190 and coupled to the support ring 190 via welding, brazing, or another fastening technique. In some embodiments, the tabs 192 may have different shapes by using other cutout patterns. In other embodiments, the support ring 190 and tabs 192 may be made from a variety of materials, such as, but not limited to various metals, metal alloys, steel, stainless steel, composites (e.g., fiber reinforced composites), and so forth. The material selected for a particular application may depend on the fluid conveyed by the flexible pipe 12 and other service conditions, such as pressure, temperature, and so forth. The tabs 192 may be cut from the support ring 190 using a variety of techniques, such as, but not limited to, cutting, snipping, sawing, water jet cutting, laser cutting, plasma cutting, and so forth. In the illustrated embodiment, four tabs 192 are formed along the inside diameter 196 and four tabs 192 are formed along the outside diameter 194. However, in other embodiments, different numbers of tabs 192 may be used, such as 1, 2, 3, 5, 6, or more tabs along one or both of the inside and outside diameters 196 and 194. The tabs 192 may be spaced apart from one another evenly or not.

Figure 8:
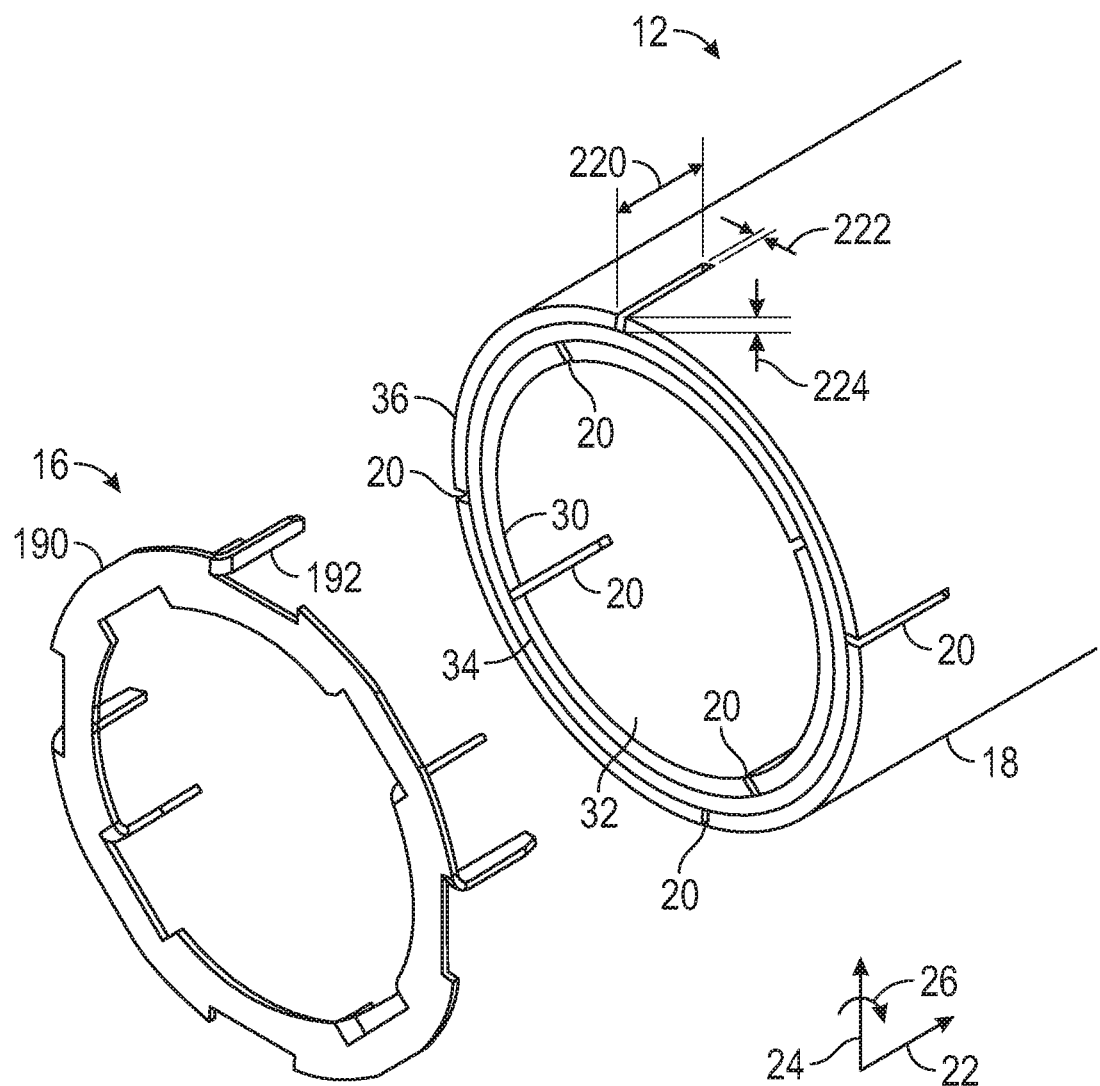
FIG. 8 is a perspective view of a securing mechanism prior to inserting into a flexible pipe according to embodiments of the present disclosure.

FIG. 8 illustrates a perspective view of an embodiment of the securing mechanism 16 prior to inserting into the flexible pipe 12. As shown in FIG. 8, openings 20 have been formed in the flexible pipe 12 corresponding to the tabs 192 of the securing mechanism 16. Specifically, four openings 20 have been formed in the liner 30 and four openings 20 have been formed in the shield layer 36 corresponding to the eight tabs 192 of the securing mechanism 16. The number and arrangement of the openings 20 may be varied depending on the configuration of the securing mechanism 16. In the illustrated embodiment, the openings 20 may be defined by a length 220, a width 222, and a height 224. In general, the length 220, width 222, and height 224 of the openings 20 may be equal to or slightly greater than the corresponding length 202, thickness 200, and height 204 of the tabs 192 to enable the tabs 192 to easily be disposed in the openings 20. However, in certain embodiments, the length 220, width 222, and height 224 of the openings 20 may be slightly less than the corresponding length 202, thickness 200, and height 204 of the tabs 192 to provide an interference fit that helps prevent the securing mechanism 16 from being easily separated from the end 18 of the flexible pipe 12. In certain embodiments, the securing mechanism 16 may be coupled to the reinforcement layer 34 prior to coupling the pipe fitting 14 to the end 18 of the flexible pipe 12. In other words, adhesive, welding, brazing, or other fastening techniques may be used to help prevent the securing mechanism 16 from uncoupling from the flexible pipe 12 before coupling the pipe fitting 14. In general, the width 222 of the opening may be reduced to reduce the amount of reinforcement layer 34 exposed by the openings 20, thereby maintaining the hoop strength of the shield layer 36 and helping to prevent the steel layers of the reinforcement layer 34 from pushing outwards.

In certain embodiments, the length 220 of the opening 20 may be generally longer than the length 202 of the tab 192 to enable the support ring 190 to be flush against the end 18 of the flexible pipe 12 when installed. The openings 20 may be formed in the flexible pipe 12 using a variety of techniques, such as, but not limited to, cutting, sawing, drilling, melting, water jet cutting, laser cutting, plasma cutting, and so forth. In certain embodiments, the height 224 of the openings 20 may correspond to the thickness of the liner 30 and shield layer 36. Thus, the tabs 192 may contact the reinforcement layer 34. In other embodiments, the height 224 of the openings 20 may be slightly less than the thickness of the liner 30 and shield layer 36. In such embodiments, the openings 20 do not open into the reinforcement layer 34. In these embodiments, the securing mechanism 16 is forced through the liner 30, the shield layer 36, or both into the reinforcement layer 34 during the swaging process.

Figure 9:
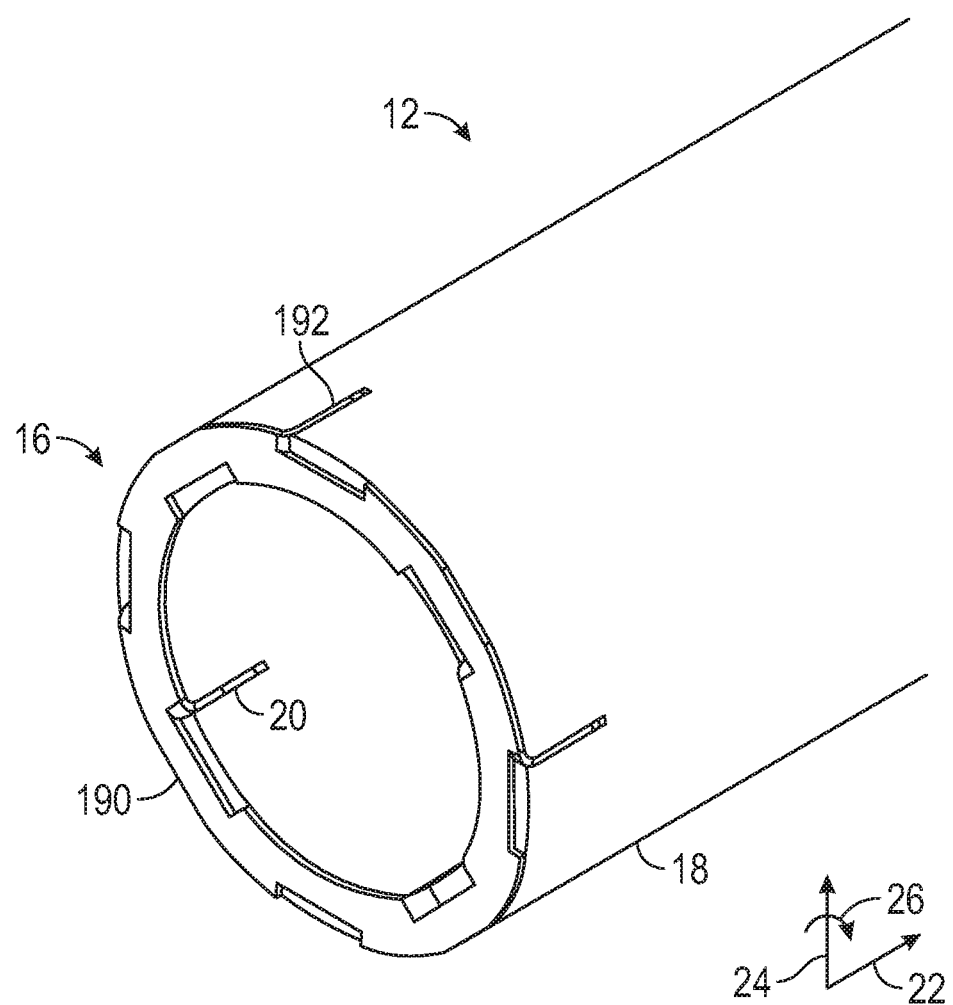
FIG. 9 is a perspective view of a securing mechanism installed in a flexible pipe according to embodiments of the present disclosure.

FIG. 9 illustrates a perspective view of an embodiment of the securing mechanism 16 installed in the flexible pipe 12. As shown in FIG. 9, the tabs 192 of the securing mechanism 16 have been inserted into the openings 20 of the flexible pipe 12. In addition, the securing mechanism 16 may be generally flush or in contact with the end 18 of the flexible pipe 12. In other embodiments, a gap may be provided between the securing mechanism 12 and the end 18 of the flexible pipe 12. In other words, the securing mechanism 16 may be partially disposed in the opening 20. After the securing mechanism 16 has been coupled to the end 18 of the flexible pipe 12, the flexible pipe 12 may be inserted in the pipe fitting 14, such as the midline fitting shown in FIGS. 3-5, the end fitting shown in FIG. 6, or another type of pipe fitting 14. Alternatively, the securing mechanism 16 may be inserted into the pipe fitting 14 first and then the flexible pipe 12 inserted into the pipe fitting 14, thereby engaging the securing mechanism 16 to the flexible pipe 12. In such embodiments, the securing mechanism 16 may be permanently coupled to the pipe fitting 14, such as via welding or brazing, or simply inserted into the pipe fitting 14 without a permanent connection. Afterwards, the pipe fitting 14 may be secured to the flexible pipe 12, such as via the swaging process described above. During the swaging process, the tabs 192 may be moved or forced against the reinforcement layer 34 by moving in the radial direction 24. Specifically, tabs 192 disposed along the outside diameter 194 of the securing mechanism 16 may be moved or forced inward against the reinforcement layer 34 (i.e., toward the axial axis 22) and tabs 192 disposed along the inside diameter 196 of the securing mechanism 16 may be moved or forced outward against the reinforcement layer 34 (i.e., away from the axial axis 22). Thus, the swaging process causes the tabs 192 of the securing mechanism 16 to engage with the reinforcement layer 34, thereby providing a more secure connection between the pipe fitting 14 and the flexible pipe 12. In other words, the securing mechanism 16 provides for metal-to-metal contact between the pipe fitting 14 and the metal located in the reinforcement layer 34 compared to metal-to-plastic contact between the pipe fitting 14 and the plastic of the liner 30 or shield layer 36. Such metal-to-metal contact may enable the pipe fitting 14 to resist higher pressures or loads that could possibly cause the pipe fitting 14 to uncouple from the end 18 of the flexible pipe 12. The metal-to-metal contact may also be described as grabbing or locking down onto the reinforcement layer 34. In addition, when performing fitting integrity testing, which simulates the creep behavior of the plastic over a defined lifecycle of use, the integrity of the plastic is affected by the creep. The ability to "grab" or "lock into" the reinforcement layer 34 of the flexible pipe 12 via the securing mechanism 12 through the pipe fitting 14 is desirable and may bypass the dependency of grabbing the plastic layers of the flexible pipe 12.

As shown in FIG. 9, the tabs 192 disposed in the shield layer 36 are approximately opposite from the tabs 192 disposed in the liner 30. As such, when the swaging process is used on the pipe fitting 14, the tabs 192 may grip or engage the reinforcement layer 34 from opposite sides, thereby providing a more secure connection of the pipe fitting 14 with the end 18 of the flexible pipe 12. In other embodiments, the securing mechanism 16 may include tabs 192 that engage only one of the shield layer 36 or the liner 30.

Figure 10:
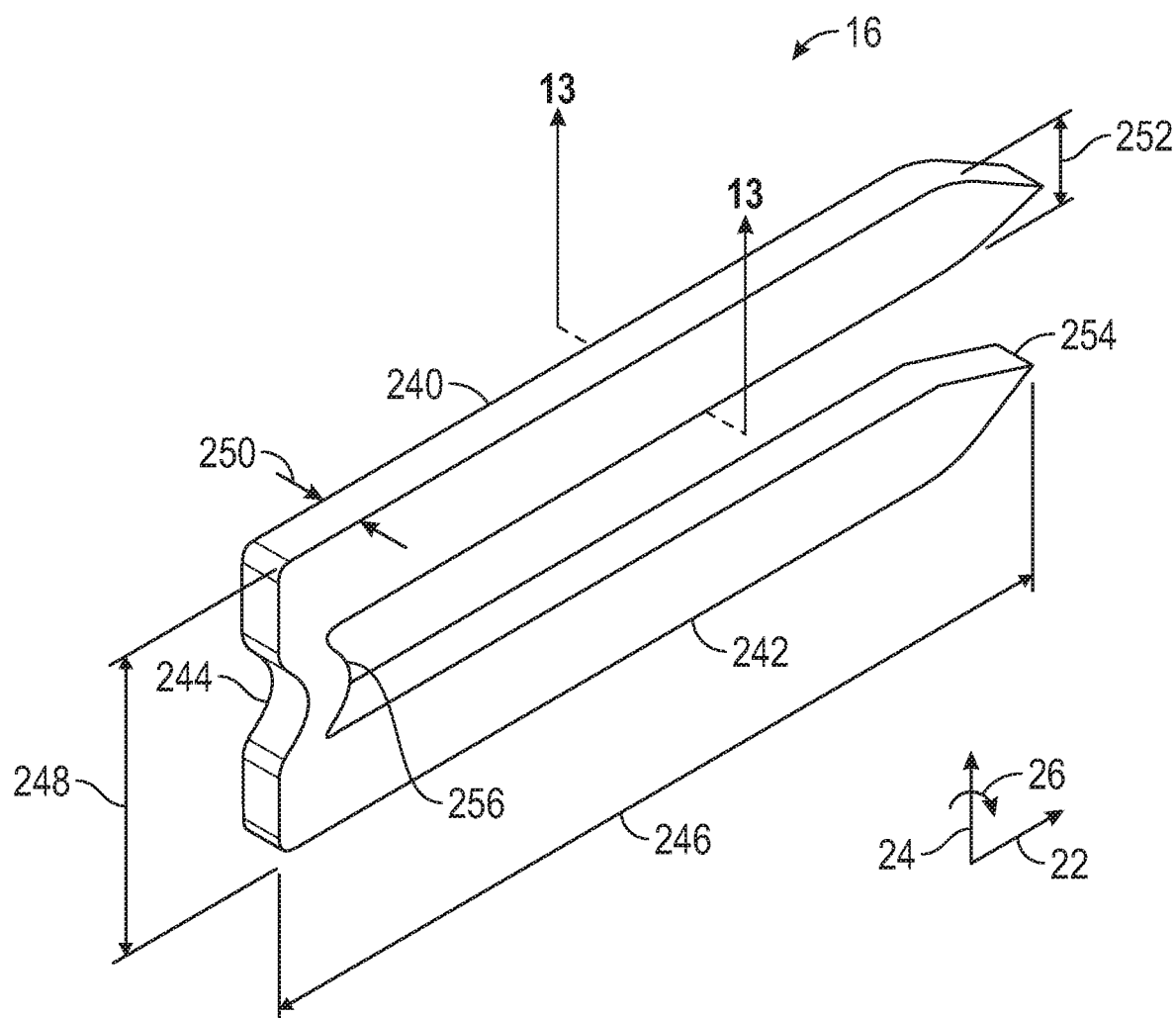
FIG. 10 is a perspective view of a securing mechanism according to embodiments of the present disclosure.

FIG. 10 illustrates a perspective view of an embodiment of the securing mechanism 16. In the illustrated embodiment, the securing mechanism 16 includes a first leg 240, a second leg 242, and a connector 244. The securing mechanism 16 may be defined by a length 246, an overall height 248, and a thickness 250. In addition, each of the first and second legs 240 and 242 may be defined by a leg height 252. In certain embodiments, each of the first and second legs 240 and 242 may include a point 254 that cases insertion of the securing mechanism 16 into the flexible pipe 12. The point 254 may be a beveled edge, sharpened point or cone, or other shape smaller than the cross-sectional shape of the rest of the first or second leg 240 or 242. In other embodiments, the point 254 may be omitted. As shown in FIG. 10, the connector 244 may couple together the first and second legs 240 and 242. In addition, the connector 244 may include a crumple zone 256 configured to at least partially collapse when the swaging process is used to secure the pipe fitting 14 to the end 18 of the flexible pipe 12. The crumple zone 256 may be an angled or double-beveled shape that enables the connector 244 to fold when a force is applied parallel to the radial direction 24. In certain embodiments, the crumple zone 256 may be omitted.

In certain embodiments, the securing mechanism 16 shown in FIG. 10 may be made from a variety of materials, such as, but not limited to various metals, metal alloys, steel, stainless steel, composites (e.g., fiber reinforced composites), and so forth. The material selected for a particular application may depend on the fluid conveyed by the flexible pipe 12 and other service conditions, such as pressure, temperature, and so forth. The securing mechanism 16 may be cut from a sheet metal or similar material using a variety of techniques, such as, but not limited to, cutting, snipping, sawing, water jet cutting, laser cutting, plasma cutting, and so forth.

Figure 11:
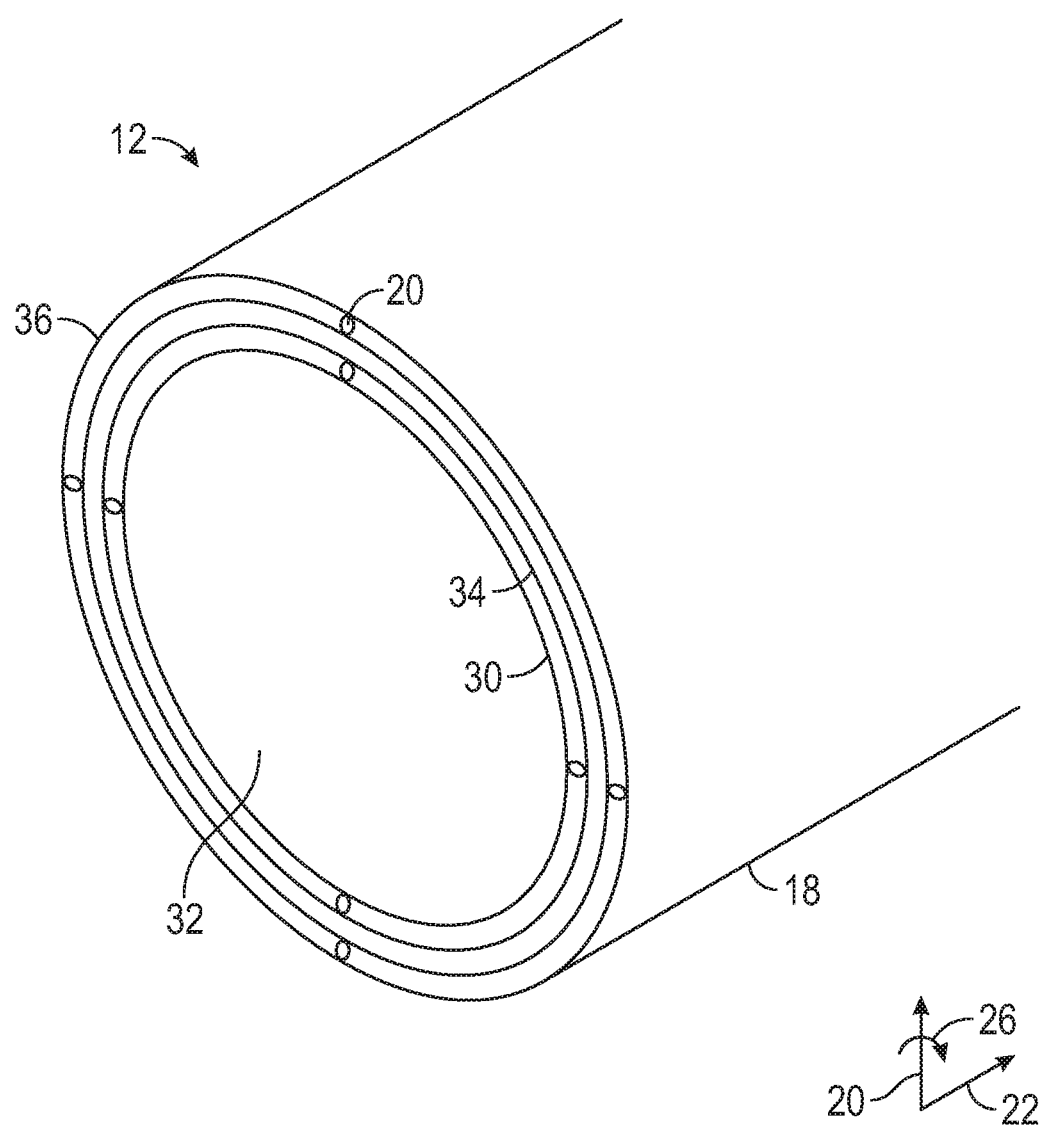
FIG. 11 is a perspective view of a flexible pipe prior to insertion of a securing mechanism according to embodiments of the present disclosure.

FIG. 11 illustrates a perspective view of an embodiment of the flexible pipe 12 prior to insertion of the securing mechanism 16 of FIG. 10. As shown in FIG. 11, openings 20 have been formed in the flexible pipe 12 corresponding to the first and second legs 240 and 242 of the securing mechanism 16. Specifically, four pairs of openings 20 have been formed in the flexible pipe 12 with one opening 20 formed in the liner 30 and another opening 20 formed in the shield layer 36 for each pair of openings 20. The number and arrangement of the pairs of openings 20 may be varied depending on the securing requirements of a particular application. Thus, in some embodiments, different numbers of pairs of openings 20 may be used, such as 1, 2, 3, 5, 6, or more pairs of openings 20 and the pairs of openings 20 may be spaced apart from one another evenly or not. Further the size, shape, and/or dimensions of the openings 20 may be varied depending on the size, shape, and/or dimensions of the first and second legs 240 and 242 of the securing mechanism 16.

In general, the size and/or dimensions of the openings 20 may be equal to or slightly greater than the corresponding size and/or dimensions of the first and second legs 240 and 242 of the securing mechanism 16 to enable the first and second legs 240 and 242 to easily be disposed in the openings 20. However, in certain embodiments, the size and/or dimensions of the openings 20 may be slightly less than the corresponding size and/or dimensions of the first and second legs 240 and 242 to provide an interference fit that helps prevent the securing mechanism 16 from being easily separated from the end 18 of the flexible pipe 12. As with the tabs 192 described above, adhesive, welding, brazing, or other fastening techniques may be used to help prevent the first and second legs 240 and 242 of the securing mechanism 16 from uncoupling from the flexible pipe 12 before coupling the pipe fitting 14.

In certain embodiments, a length of the opening 20 may be generally longer than the length 246 of the securing mechanism 16 to enable the connector 244 to be flush against the end 18 of the flexible pipe 12 when installed. The openings 20 may be formed in the flexible pipe 12 using a variety of techniques, such as, but not limited to, cutting, sawing, drilling, melting, water jet cutting, laser cutting, plasma cutting, and so forth. In certain embodiments, the openings 20 in the liner 30 and/or shield layer 36 may open into the reinforcement layer 34, but in other embodiments, the openings 20 may not open into the reinforcement layer 34. In these embodiments, the securing mechanism 16 is forced through the liner 30, the shield layer 36, or both into the reinforcement layer 34 during the swaging process.

Figure 12:
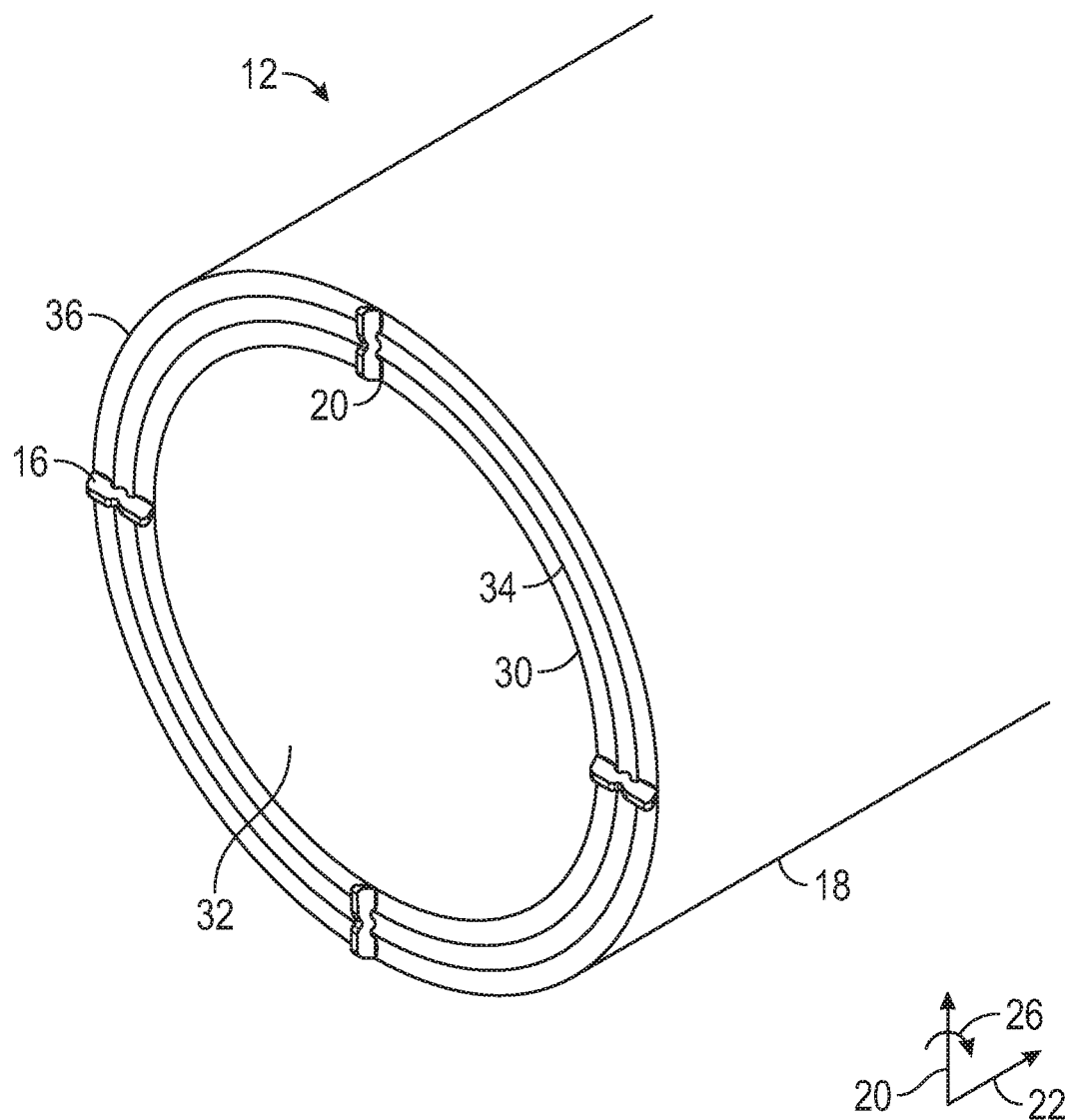
FIG. 12 is a perspective view of a securing mechanism installed in a flexible pipe according to embodiments of the present disclosure.

FIG. 12 illustrates a perspective view of an embodiment of the securing mechanism 16 installed in the flexible pipe 12. As shown in FIG. 12, the first and second legs 240 and 242 of the securing mechanism 16 have been inserted into the openings 20 of the flexible pipe 12. In addition, the securing mechanism 16 may be generally flush or in contact with the end 18 of the flexible pipe 12. In other embodiments, a gap may be provided between the securing mechanism 12 and the end 18 of the flexible pipe 12. In other words, the securing mechanism 16 may be partially disposed in the opening 20. After the securing mechanism 16 has been coupled to the end 18 of the flexible pipe 12, the flexible pipe 12 may be inserted in the pipe fitting 14, such as the midline fitting shown in FIGS. 3-5, the end fitting shown in FIG. 6, or another type of pipe fitting 14. Alternatively, the securing mechanism 16 may be inserted into the pipe fitting 14 first and then the flexible pipe 12 inserted into the pipe fitting 14, thereby engaging the securing mechanism 16 to the flexible pipe 12. In such embodiments, the securing mechanism 16 may be permanently coupled to the pipe fitting 14, such as via welding or brazing, or simply inserted into the pipe fitting 14 without a permanent connection. Afterwards, the pipe fitting 14 may be secured to the flexible pipe 12, such as via the swaging process described above. During the swaging process, the first and second legs 240 and 242 may be moved or forced against the reinforcement layer 34 by moving in the radial direction 24. Specifically, the first leg 240 may be moved or forced inward against the reinforcement layer 34 (i.e., toward the axial axis 22) and the second leg 242 may be moved or forced outward against the reinforcement layer 34 (i.e., away from the axial axis 22). Thus, the swaging process causes the first and second legs 240 and 242 of the securing mechanism 16 to engage with the reinforcement layer 34, thereby providing a more secure connection between the pipe fitting 14 and the flexible pipe 12. In other words, the securing mechanism 16 provides for metal-to-metal contact between the pipe fitting 14 and the metal located in the reinforcement layer 34 compared to metal-to-plastic contact between the pipe fitting 14 and the plastic of the liner 30 or shield layer 36. Such metal-to-metal contact may enable the pipe fitting 14 to resist higher pressures or loads that could possible cause the pipe fitting 14 to uncouple from the end 18 of the flexible pipe 12.

As shown in FIG. 12, the first and second legs 240 and 242 are approximately opposite from one another. As such, when the swaging process is used on the pipe fitting 14, the first and second legs 240 and 242 may grip or engage the reinforcement layer 34 from opposite sides, thereby providing a more secure connection of the pipe fitting 14 with the end 18 of the flexible pipe 12. In other embodiments, the securing mechanism 16 may include only one of the first and second legs 240 and 242 to engage only one of the shield layer 36 or the liner 30. In such embodiments, the connector 244 may be omitted.

Figure 13:
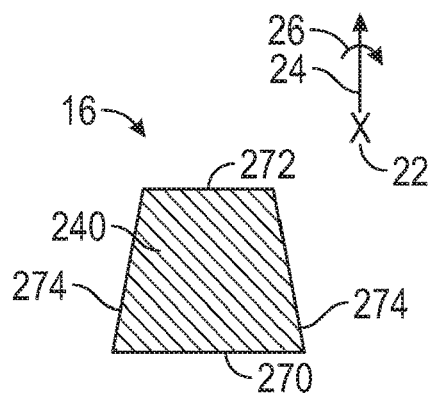
FIG. 13 is a cross-sectional view of a first leg of a securing mechanism according to embodiments of the present disclosure.

FIG. 13 illustrates a cross-sectional view of the first leg 240 of the securing mechanism 16 shown in FIG. 10. However, the following discussion applies equally to the second leg 242 of the securing mechanism 16 or the tabs 192 of the securing mechanism shown in FIGS. 7-9. As discussed earlier, the shape of the first and second legs 240 and 242 may be varied depending on the requirements for a particular application. As shown in FIG. 13, the first leg 240 has a trapezoidal cross-sectional shape with a long base 270 having a length longer than a short base 272. Such a configuration may provide for additional surface area of the first leg 240 in contact with the reinforcement layer 34, thereby increasing the gripping provided for by the securing mechanism 16. The legs 274 of the first leg 240 may be straight as shown in FIG. 13 or curved.

Figure 14:
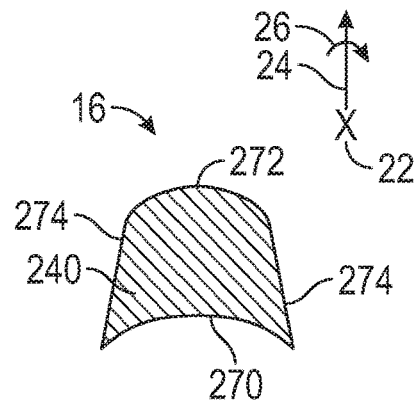
FIG. 14 is a cross-sectional view of a first leg of a securing mechanism according to embodiments of the present disclosure.

FIG. 14 illustrates a cross-sectional view of an embodiment of the first leg 240 of the securing mechanism 16 shown in FIG. 10. The following discussion applies equally to the second leg 242 of the securing mechanism 16 or the tabs 192 of the securing mechanism shown in FIGS. 7-9. As shown in FIG. 14, the first leg 240 has a curved trapezoidal cross-sectional shape (i.e., annular sector) with the long base 270 being curved and having a length longer than the short base 272 that is also curved. Such a configuration may enable additional surface area of the first leg 240 to be in contact with the curved surface of the reinforcement layer 34, thereby increasing the gripping provided for by the securing mechanism 16. The legs 274 of the first leg 240 may be straight as shown in FIG. 14 or curved. In addition, certain aspects of the first legs 240 shown in FIGS. 13 and 14 may be combined or rearranged. For example, the long base 270 may be curved and the short base 272 may be straight in certain embodiments.

Figure 15:
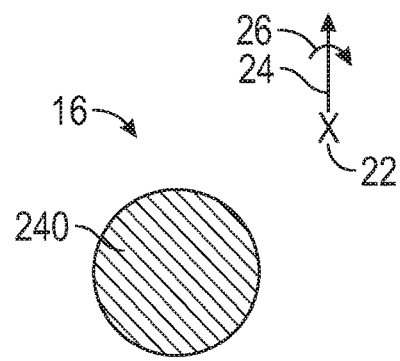
FIG. 15 is a cross-sectional view of a first leg of a securing mechanism according to embodiments of the present disclosure.

FIG. 15 illustrates a cross-sectional view of an embodiment of the first leg 240 of the securing mechanism 16 shown in FIG. 10. The following discussion applies equally to the second leg 242 of the securing mechanism 16 or the tabs 192 of the securing mechanism shown in FIGS. 7-9. As shown in FIG. 15, the first leg 240 has a circular or oval cross-sectional shape. Such a configuration may simplify the construction of the securing mechanism 16 and/or reduce the cost of the securing mechanism 16. When the securing mechanism 16 undergoes the swaging process, the cross-sectional shape may correspond more to an oval, thereby increasing the surface area of the first leg 240 in contact with the reinforcement layer 34. Although certain cross-sectional shapes have been shown in FIGS. 13-15, other shapes may be possible including, but not limited to, various square, rectangular, circular, oval, triangular, polygonal, trapezoidal, or curved cross-sectional shapes.

Figure 16:
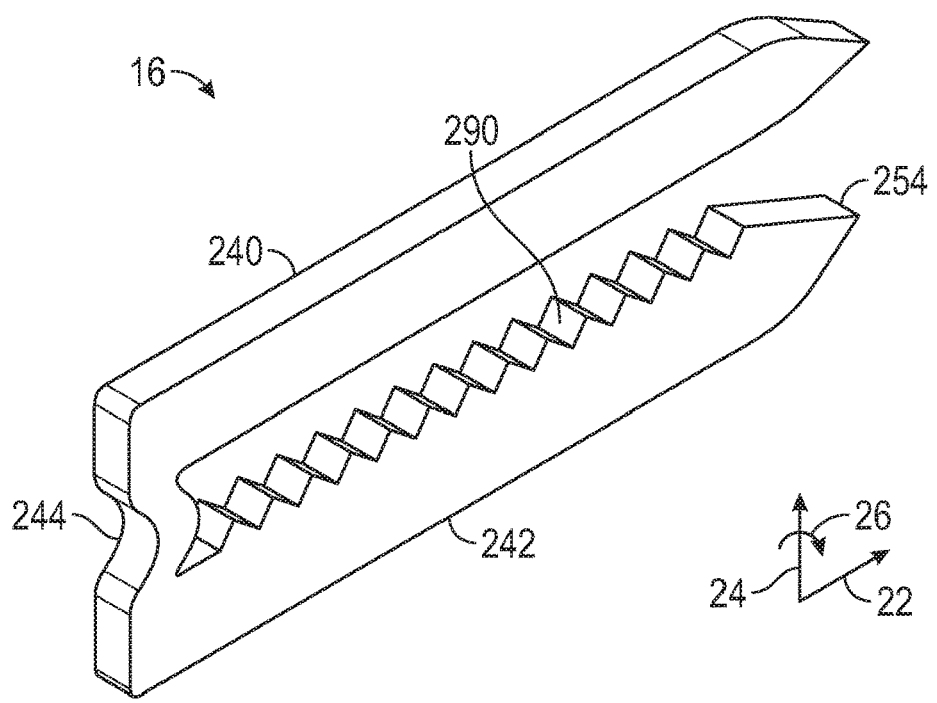
FIG. 16 is a perspective view of a securing mechanism according to embodiments of the present disclosure.

FIG. 16 illustrates a perspective view of an embodiment of the securing mechanism 16. In the illustrated embodiment, the second leg 242 has a serrated surface 290, which may provide increased gripping of the second leg 242 against the reinforcement layer 34. In other words, the serrated surface 290 may help the securing mechanism 16 resist being pulled out of the opening 20 after insertion and/or after the swaging process. In certain embodiments, the first leg 240 may have the serrated surface 290 or both the first and second legs 240 and 242 may have serrated surfaces 290.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A securing mechanism for a flexible pipe, comprising:
a first leg configured to be at least partially disposed within a first opening that is formed in a liner layer of the flexible pipe such that the first leg extends alongside a bore of the flexible pipe, wherein the liner layer defines the bore of the flexible pipe and the flexible pipe comprises a reinforcement layer implemented around the liner layer;
a second leg configured to be at least partially disposed within a second opening that is formed in a shield layer of the flexible pipe such that the second leg extends alongside the bore of the flexible pipe, wherein the shield layer is implemented around the reinforcement layer of the flexible pipe; and
a connector that connects the first leg and the second leg, wherein the connector is configured to enable the securing mechanism to be deformed such that the first leg and the second leg engage the reinforcement layer of the flexible pipe to facilitate securing an end of the flexible pipe in a pipe fitting.

2. The securing mechanism of claim 1, wherein the first leg is configured to be disposed within the first opening and the second leg is configured to be disposed within the second opening such that the connector is flush with the end of the flexible pipe.

3. The securing mechanism of claim 1, wherein the first leg is configured to be disposed within the first opening and the second leg is configured to be disposed within the second opening such that a gap is left between the connector of the securing mechanism and the end of the flexible pipe.

4. The securing mechanism of claim 1, wherein the connector comprises a crumple zone configured to at least partially collapse when a jacket of the pipe fitting is deformed around the flexible pipe to facilitate securing the end of the flexible pipe in the pipe fitting.

5. The securing mechanism of claim 1, wherein the first leg, the second leg, or both comprise serrations that extend perpendicular to the bore of the flexible pipe.

6. The securing mechanism of claim 1, wherein the first leg, the second leg, or both comprise a trapezoidal cross-sectional shape.

7. The securing mechanism of claim 1, wherein:
the first leg comprises a convex inward-facing surface; and
the second leg comprises a concave inward-facing surface.

8. The securing mechanism of claim 1, wherein:
the connector comprises a support ring;
the first leg comprises a first tab that extends out from the support ring; and
the second leg comprises a second tab that extends out from the support ring.

9. The securing mechanism of claim 8, wherein:
the first tab extends out from an outer diameter of the support ring; and
the second tab extends out from an inner diameter of the support ring.

10. A securing mechanism for a flexible pipe, comprising:
a support ring configured to be disposed at an end of the flexible pipe that is to be secured in a pipe fitting;
a first plurality of tabs that extend out from the support ring, wherein each tab of the first plurality of tabs is configured to be inserted into a liner layer of the flexible pipe that is implemented within a reinforcement layer of the flexible pipe; and
a second plurality of tabs that extend out from the support ring, wherein each tab of the plurality of tabs is configured to be inserted into a shield layer of the flexible pipe that is implemented around the reinforcement layer of the flexible pipe.

11. The securing mechanism of claim 10, wherein:
each tab of the first plurality of tabs extends out from an outer diameter of the support ring; and
each tab of the second plurality of tabs extends out from an inner diameter of the support ring.

12. The securing mechanism of claim 10, wherein:
each tab of the first plurality of tabs is implemented at least in part by cutting and bending material along an outer diameter of the support ring; and
each tab of the second plurality of tabs is implemented at least in part by cutting and bending material along an inner diameter of the support ring.

13. The securing mechanism of claim 10, wherein:
each tab of the first plurality of tab is configured to be forced outwardly through the liner layer of the flexible pipe to engage the reinforcement layer of the flexible pipe when a jacket of the pipe fitting is deformed around the flexible pipe to facilitate securing the end of the flexible pipe in the pipe fitting; and
each tab of the second plurality of tabs is configured to be forced inwardly through the shield layer of the flexible pipe to engage the reinforcement layer of the flexible pipe when the jacket of the pipe fitting is deformed around the flexible pipe to facilitate securing the end of the flexible pipe in the pipe fitting.

* * * * *